United States Patent
Touboul et al.

(10) Patent No.: US 9,690,932 B2
(45) Date of Patent: Jun. 27, 2017

(54) PREDICTING AND PREVENTING AN ATTACKER'S NEXT ACTIONS IN A BREACHED NETWORK

(71) Applicant: Illusive Networks Ltd., Tel Aviv (IL)

(72) Inventors: Shlomo Touboul, Kfar Chaim (IL); Hanan Levin, Tel Aviv (IL); Stephane Roubach, Herzliya (IL); Assaf Mischari, Petach Tikva (IL); Itai Ben David, Tel Aviv (IL); Itay Avraham, Tel Aviv (IL); Adi Ozer, Shoham (IL); Chen Kazaz, Tel Aviv (IL); Ofer Israeli, Tel Aviv (IL); Olga Vingurt, Shderot (IL); Liad Gareh, Herzliya (IL); Israel Grimberg, Ra'anana (IL); Cobby Cohen, Tel Aviv (IL); Sharon Sultan, Tel Aviv (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 15/175,054

(22) Filed: Jun. 7, 2016

(65) Prior Publication Data
US 2017/0149832 A1 May 25, 2017

Related U.S. Application Data

(60) Provisional application No. 62/172,251, filed on Jun. 8, 2015, provisional application No. 62/172,253, filed
(Continued)

(51) Int. Cl.
*G06F 21/55* (2013.01)

(52) U.S. Cl.
CPC .................................. *G06F 21/55* (2013.01)

(58) Field of Classification Search
CPC .......... H04L 63/14; H04L 63/16; G06F 21/56
See application file for complete search history.

(56) References Cited

U.S. PATENT DOCUMENTS

| 6,363,489 B1 | 3/2002 | Comay et al. |
| 7,089,589 B2 | 8/2006 | Chefalas et al. |

(Continued)

FOREIGN PATENT DOCUMENTS

WO    2006131124 A1    12/2006

OTHER PUBLICATIONS

Wikipedia, Active Directory, https://en.wikipedia.org/wiki/Active_Directory, Jun. 24, 2015.
(Continued)

*Primary Examiner* — Izunna Okeke
(74) *Attorney, Agent, or Firm* — Soquel Group I.P Ltd

(57) ABSTRACT

A method for cyber security, including detecting, by a decoy management server, a breach by an attacker of a specific resource within a network of resources in which users access the resources based on credentials, wherein each resource has a domain name server (DNS) record stored on a DNS server, changing, by the decoy management server, the DNS record for the breached resource on the DNS server, in response to the detecting, predicting, by the decoy management server, which credentials are compromised, based on credentials stored on the breached resource, and changing, by the decoy management server, those credentials that were predicted to be compromised, in response to the predicting which credentials.

9 Claims, 3 Drawing Sheets

Related U.S. Application Data on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(56) References Cited

U.S. PATENT DOCUMENTS

| | | | |
|---|---|---|---|
| 7,093,291 | B2 | 8/2006 | Bailey |
| 7,574,741 | B2 | 8/2009 | Aviani et al. |
| 7,636,944 | B2 | 12/2009 | Raikar |
| 7,665,134 | B1 | 2/2010 | Hernacki et al. |
| 7,694,339 | B2 | 4/2010 | Blake et al. |
| 7,725,937 | B1 | 5/2010 | Levy |
| 7,752,664 | B1 | 7/2010 | Satish et al. |
| 8,181,249 | B2 | 5/2012 | Chow et al. |
| 8,181,250 | B2 | 5/2012 | Rafalovich et al. |
| 8,375,447 | B2 | 2/2013 | Amoroso et al. |
| 8,528,091 | B2 | 9/2013 | Bowen et al. |
| 8,549,642 | B2 | 10/2013 | Lee |
| 8,549,643 | B1 | 10/2013 | Shou |
| 8,719,938 | B2 | 5/2014 | Chasko et al. |
| 8,739,281 | B2 | 5/2014 | Wang et al. |
| 8,769,684 | B2 | 7/2014 | Stolfo et al. |
| 8,819,825 | B2 | 8/2014 | Keromytis et al. |
| 8,856,928 | B1 | 10/2014 | Rivner et al. |
| 9,009,829 | B2 | 4/2015 | Stolfo et al. |
| 2002/0066034 | A1 | 5/2002 | Schlossberg et al. |
| 2003/0084349 | A1 | 5/2003 | Friedrichs et al. |
| 2006/0224677 | A1 | 10/2006 | Ishikawa et al. |
| 2007/0028301 | A1 | 2/2007 | Shull et al. |
| 2007/0192853 | A1 | 8/2007 | Shraim et al. |
| 2008/0016570 | A1 | 1/2008 | Capalik |
| 2008/0086773 | A1 | 4/2008 | Tuvell et al. |
| 2009/0019547 | A1 | 1/2009 | Palliyil et al. |
| 2009/0241191 | A1 | 9/2009 | Keromytis et al. |
| 2009/0241196 | A1 | 9/2009 | Troyansky et al. |
| 2010/0077483 | A1 | 3/2010 | Stolfo et al. |
| 2010/0251369 | A1 | 9/2010 | Grant |
| 2011/0154494 | A1* | 6/2011 | Sundaram ............ H04L 63/108 726/23 |
| 2011/0214182 | A1 | 9/2011 | Adams et al. |
| 2012/0167208 | A1 | 6/2012 | Buford et al. |
| 2013/0212644 | A1 | 8/2013 | Hughes et al. |
| 2014/0115706 | A1 | 4/2014 | Silva et al. |
| 2014/0208401 | A1 | 7/2014 | Balakrishnan et al. |
| 2014/0310770 | A1 | 10/2014 | Mahaffey |
| 2014/0337978 | A1 | 11/2014 | Keromytis et al. |
| 2014/0359708 | A1 | 12/2014 | Schwartz |
| 2015/0096048 | A1 | 4/2015 | Zhang et al. |
| 2015/0128246 | A1 | 5/2015 | Feghali et al. |

OTHER PUBLICATIONS

Wikpedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
PCT Application No. PCT/IL16/50103, International Search Report and Written Opinion, May 26, 2016, 9 pages.
U.S. Appl. No. 15/004,904, Office Action, May 27, 2016, 16 pages.
PCT Application No. PCT/IL2016/050581, International Search Report and Written Opinion, Nov. 29, 2016, 10 pages.

* cited by examiner

PREDICTING AND PREVENTING AN ATTACKER'S NEXT ACTIONS IN A BREACHED NETWORK

CROSS REFERENCES TO RELATED APPLICATIONS

This application is a non-provisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

FIELD OF THE INVENTION

The present invention relates to cyber security, and in particular to computer network surveillance.

BACKGROUND OF THE INVENTION

Reference is made to FIG. 1, which is a simplified diagram of a prior art enterprise network 100 connected to an external internet 10. Network 100 is shown generally with resources including computers 110, servers 120, switches and routers 130, and mobile devices 140 such as smart phones and tablets, for ease of presentation, although it will be appreciated by those skilled in the art that enterprise networks today are generally much more varied and complex and include other devices such as printers, phones and any Internet of Things objects. The various connections shown in FIG. 1 may be direct or indirect, wired or wireless communications, or a combination of wired and wireless connections. Computers 110 and servers 120 may be physical elements or logical elements, or a mix of physical and logical elements. Computers 110 and servers 120 may be physical or virtual machines. Computers 110 and servers 120 may be local, remote or cloud-based elements, or a mix of local, remote and cloud-based elements. Computers 110 may be client workstation computers. Servers 120 may be file transfer protocol (FTP) servers, email servers, structured query language (SQL) servers, secure shell (SSH) servers, and other database and application servers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and servers 120 based on "credentials" and other methods of authentication. Access governor 150 may be a name directory, such as ACTIVE DIRECTORY® developed by Microsoft Corporation of Redmond, Wash., for WINDOWS® environments. Background information about ACTIVE DIRECTORY is available at Wikipedia. Other access governors for WINDOWS and non-WINDOWS environments include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. For networks that do not include an access governor, authentication may be performed by other servers 120. Alternatively, in lieu of access governor 150, resources of network 100 determine their local access rights.

Credentials for accessing computers 110 and servers 120 include inter alia server account credentials such as <address> <username> <password> for an FTP server, a database server, or an SSH server. Credentials for accessing computers 110 and servers 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another method of authentication. Background information about the Kerberos protocol and LM hashes is available at Wikipedia.

Access governor 150 may maintain a directory of computers 110, servers 120 and their users. Access governor 150 authorizes users and computers, assigns and enforces security policies, and installs and updates software.

Computers 110 may run a local or remote security service, which is an operating system process that verifies users logging in to computers, to other single sign-on systems and to other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a gateway between enterprise network 100 and external internet 10. Firewall 180 controls incoming and outgoing traffic for network 100. Background information about firewalls is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, network devices and organization structure, learns "where can I go from my current location" and "how can I go from my current location to another location (privilege required)", learns implemented security solutions, learns applications that he can leverage, and then operates in accordance with that data.

An advanced attacker may use different attack techniques to enter a corporate network and to move laterally within the network in order to obtain his resource goals. The advanced attacker may begin with a workstation, server or any other network entity to start his lateral movement. He uses different methods to enter the network, including inter alia social engineering, existing exploit and/or vulnerability, and a Trojan horse or any other malware allowing him to control a first node or nodes.

Once an attacker has taken control of a first node in a corporate network, he uses different advanced attack techniques for orientation and propagation and discovery of additional ways to reach other network nodes in the corporate network. Attacker movement from node to node is performed via an "attack vector", which is an object discovered by the attacker, including inter alia an object in memory or storage of a first computer that may be used to access or discover a second computer.

Exemplary attack vectors include inter alia credentials of users with escalated privileges, existing share names on different servers and workstations, and details including address and credentials of an FTP server, an email server, a database server or an SSH server. Attack vectors are often available to an attacker because a user did not log off of his workstation, did not log out of an application, or did not clear his cache. E.g., if a user contacted a help desk and gave a help desk administrator remote access to his workstation, and if the help desk administrator did not properly log off from the remote access session to the users workstation, then the help desk access credentials may still be stored in the user's local cache and available to the attacker. Similarly, if the user accessed a server, e.g., an FTP server, then the FTP account login parameters may be stored in the user's local cache or profile and available to the attacker.

Attack vectors enable inter alia a move from workstation A→server B based on a shared server host name and its credentials, connection to a different workstation using local admin credentials that reside on a current workstation, and connection to an FTP server using specific access credentials.

Whereas IT "sees" the logical and physical network topology, an attacker that lands on a first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "complete attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network nodes that are of value to the attacker and are his "attack goal nodes".

When the attacker lands on the first node, but does not know how to reach the attack goal node, he generates a current attack map that leads to the attack goal node.

One method to defend against such attacks, termed "honeypots", is to plant and to monitor bait resources, with the objective that the attacker discover their existence and then consume the bait resources, and to notify an administrator of the malicious activity. Background information about honeypots is available at Wikipedia.

Conventional honeypot systems operate by monitoring access to a supervised element in a computer network, the supervised element being a fake server or a fake service. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

After detection that a resource has been breached by an attack, conventional security systems react by isolating the breached resource. The breached resource may be isolated by manually unplugging it, or by running a system restore. Such reaction to detection of a breach has many drawbacks. In particular, an attacker may already have control over other resources of enterprise network 100. The attacker may have obtained data, such as credentials, connection, and IP addresses, and can continue spreading through enterprise network 100 without requiring use of the specific resource that was isolated. Dependence upon manual isolation, which may be faulty, is very risky.

SUMMARY

Embodiments of the present invention overcome the drawbacks of conventional security systems that react to an attack by isolating a breached resource. Using the present invention, an attacker's movement inside an enterprise network is predicted, and prevented inter alia by changing compromised credentials and compromised IP addresses, and by adding firewall rules for compromised connections.

There is thus provided in accordance with an embodiment of the present invention a method for cyber security, including detecting, by a decoy management server, a breach by an attacker of a specific resource within a network of resources in which users access the resources based on credentials, wherein each resource has a domain name server (DNS) record stored on a DNS server, wherein some of the resources are servers that are accessed via IP addresses, and wherein access to the network via connections that extend outside the network is governed by a firewall, changing, by the decoy management server, the DNS record for the breached resource on the DNS server, in response to the detecting, predicting, by the decoy management server, which credentials are compromised, based on credentials stored on the breached resource, changing, by the decoy management server, those credentials that were predicted to be compromised, in response to the predicting which credentials, predicting, by the decoy management server, which servers in the network are compromised, based on real and decoy connections created during the breach, changing, by the decoy management server, IP addresses of servers in response to the predicting which servers, predicting, by the decoy management server, a target subnet, based on real and decoy connections created during the breach, isolating, by the decoy management server, the target subject in response to the predicting a target subnet, predicting, by the decoy management server, data leakage paths from inside the network to outside the network, based on an open connection to outside the network during the breach, and creating, by the decoy management server, firewall rules to block outbound connections in response to the predicting data leakage paths.

There is additionally provided in accordance with an embodiment of the present invention a method for cyber security, including detecting, by a decoy management server, a breach by an attacker of a specific resource within a network of resources, wherein access to the resources via network connections is governed by a firewall, predicting, by the decoy management server, which resources of the network were exposed to the attacker, based on address pointers stored on the breached resource, and generating firewall rules to block access to the predicted exposed resources from the breached resource, in response to the predicting which resources.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

| Element | Description |
|---|---|
| 10 | Internet |
| 100 | enterprise network |
| 110 | network computers |
| 120 | network servers |
| 130 | network switches and routers |
| 140 | mobile devices |
| 150 | access governor (optional) |
| 252 | forensic alert module |
| 160 | SIEM server |
| 170 | DNS server |
| 180 | firewall |
| 200 | enterprise network with network surveillance |
| 210 | deception management server |
| 211 | policy manager |
| 212 | deployment module |
| 213 | forensic application |
| 220 | database of credential types |
| 230 | policy database |
| 240 | decoy servers |
| 242 | forensic alert module |
| 260 | update server |

Elements numbered in the 1000's are operations of flow charts.

DETAILED DESCRIPTION

In accordance with embodiments of the present invention, systems and methods are provided for responding to breach by an attacker of a resource within an enterprise network, by predicting and preventing the attacker's next actions.

Figure 1:
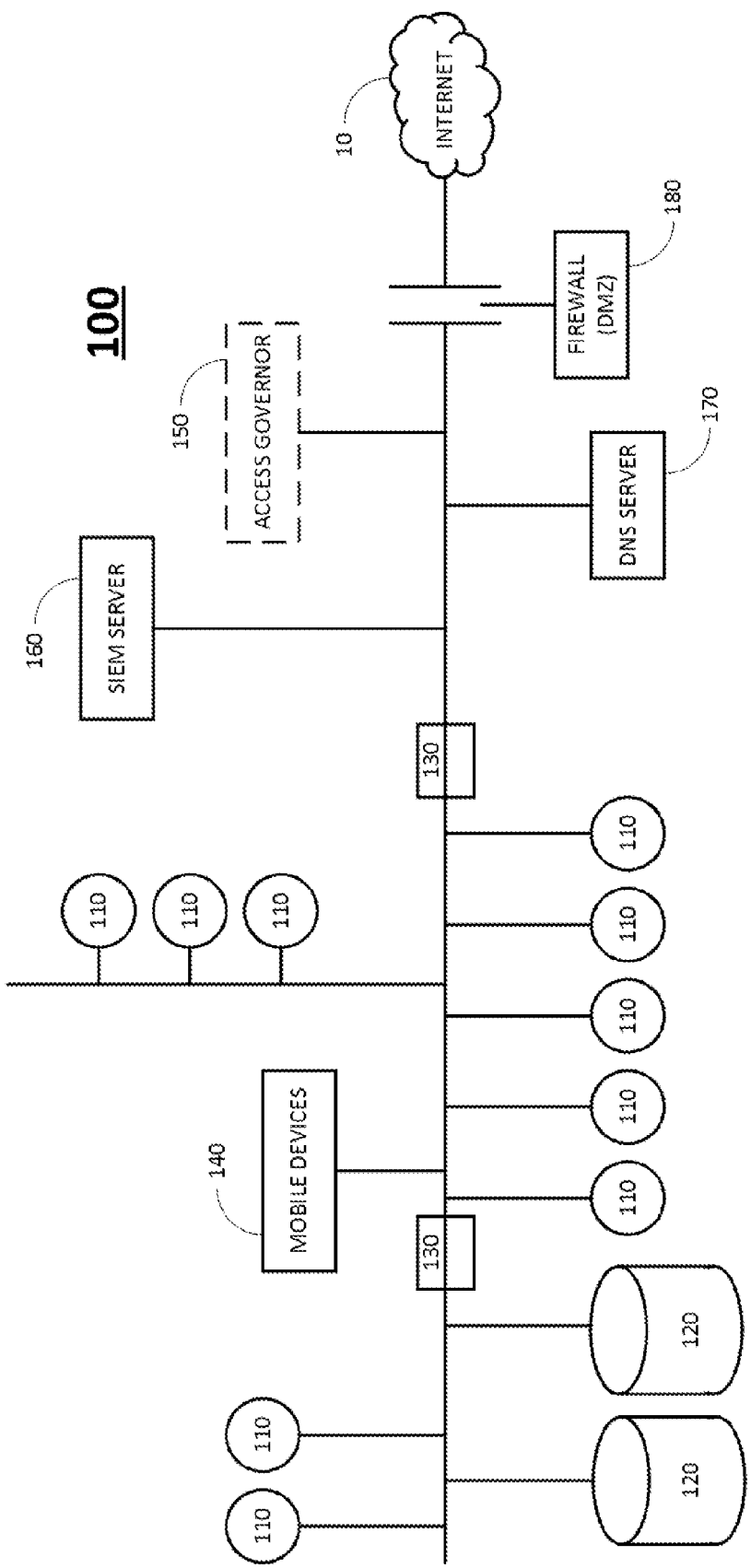
FIG. 1 is a simplified diagram of a prior art enterprise network connected to an external internet.
Figure 2:
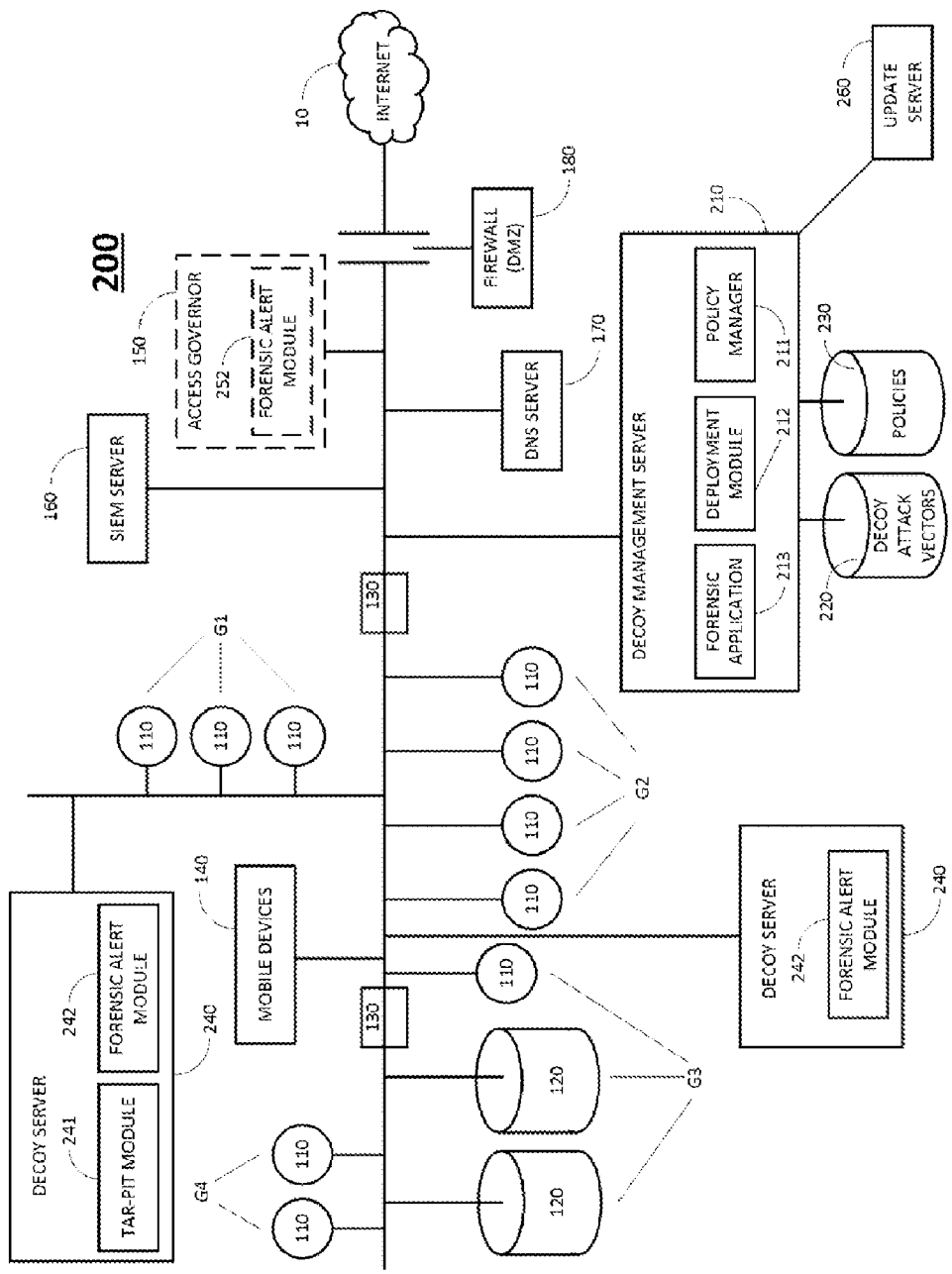
FIG. 2 is a simplified diagram of an enterprise network with network surveillance, in accordance with an embodiment of the present invention.

Reference is made to FIG. 2, which is a simplified diagram of an enterprise network 200 with network surveillance, in accordance with an embodiment of the present invention. Network 200 includes a decoy management server 210, a database 220 of decoy attack vectors, a policy database 230 and decoy servers 240. In addition, network computers 110 and servers 120 are grouped into groups G1, G2, G3 and G4.

Database 220 stores attack vectors that fake movement and access to computers 110, servers 120 and other resources in network 200. Attack vectors include inter alia:
user of the form <username>
user credentials of the form <username> <password>
user credentials of the form <username> <hash of password>
user credentials of the form <username> <ticket>
FTP server of the form <FTP address>
FTP server credentials of the form <FTP address> <username> <password>
SSH server of the form <SSH address>
SSH server credentials of the form <SSH address> <username> <password>
share address of the form <SMB address>

Each decoy attack vector in database 220 may point to (i) a real resource that exists within network 200, e.g., an FTP server, (ii) a decoy resource that exists within network 200, e.g., a trap server, or (iii) a resource that does not exist. In the latter case, when an attacker attempts to access a resource that does not exist, access governor 150 recognizes a pointer to a resource that is non-existent. Access governor 150 responds by notifying decoy management server 210, or by re-directing the pointer to a resource that does exist in order to survey the attacker's moves, or both.

The attack vectors stored in database 220 are categorized by families, such as inter alia F1—user credentials
F2—files
F3—connections
F4—FTP logins
F5—SSH logins
F6—share names
F7—databases
F8—network devices
F9—URLs
F10—Remote Desktop Protocol (RDP)
F11—recent commands
F12—scanners
F13—cookies
F14—cache
F15—Virtual Private Network (VPN)
F16—key logger Credentials for a computer B that reside on a computer A, or even an address pointer to computer B that resides on computer A, provide an attack vector for an attacker from computer A 4 computer B.

Database 220 communicates with an update server 260, which updates database 220 as attack vectors for accessing, manipulating and hopping to computers evolve over time. Update server 260 may be a separate server, or a part of decoy management server 210.

Policy database 230 stores policies for planting decoy attack vectors in computers of network 200. Each policy specifies decoy attack vectors that are planted on the computers, in accordance with attack vectors stored in database 220. For user credentials, the decoy attack vectors planted on a computer lead to another resource in the network. For attack vectors to access an FTP or other server, the decoy attack vectors planted on a computer lead to a decoy server 240.

It will be appreciated by those skilled in the art the databases 220 and 230 may be combined into a single database, or distributed over multiple databases.

Decoy management server 210 includes a policy manager 211, a deployment module 212, and a forensic application 213. Policy manager 211 defines a decoy and response policy. The decoy and response policy defines different decoy types, different decoy combinations, response procedures, notification services, and assignments of policies to specific network nodes, network users, groups of nodes or users or both. Once policies are defined, they are stored in policy database 230 with the defined assignments.

Deception management server 210 obtains the policies and their assignments from policy database 230, and delivers them to appropriate nodes and groups. It than launches deployment module 212 to plant decoys on end points, servers, applications, routers, switches, relays and other entities in the network. Deployment module 212 plants each decoy, based on its type, in memory (RAM), disk, or in any other data or information storage area, as appropriate. Deployment module 212 plants the decoy attack vectors in such a way that the chances of a valid user accessing the decoy attack vectors are Deployment module 212 may or may not stay resident.

Forensic application 213 is a real-time application that is transmitted to a destination computer in the network, when a decoy attack vector is accessed by a computer 110. When forensic application 213 is launched on the destination computer, it identifies a process running within that computer 110 that accessed that decoy attack vector, or identifies a DLL in memory injected into a process, that accessed that decoy attack vector, or identifies static data that accessed that decoy attack vector. Forensic application 230 logs the activities performed by the thus-identified process in a forensic report, and transmits the forensic report to decoy management server 210.

Once an attacker is detected, a "response procedure" is launched. The response procedure includes inter alia various notifications to various addresses, and actions on a decoy server such as launching an investigation process, and isolating, shutting down and re-imaging one or more network nodes. The response procedure collects information available on one or more nodes that may help in identifying the attacker's attack acts, intention and progress.

Each decoy server 240 includes a forensic alert module 242, which alerts management system 210 that an attacker is accessing the decoy server via a computer 110 of the network, and causes decoy management server 210 to send forensic application 213 to the computer that is accessing the decoy server. In an alternative embodiment of the present invention, decoy server 240 may store forensic application 213, in which case decoy server 240 may transmit forensic application 213 directly to the computer that is accessing the decoy server. In another alternative embodiment of the present invention, decoy management server 210 or decoy server 240 may transmit forensic application 213 to a destination computer other than the computer that is accessing the decoy server. Access governor 150 also activates a forensic alert module 252, which alerts decoy management server 210 that an attacker is attempting to use a decoy credential.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or such other analytics.

Figure 3:
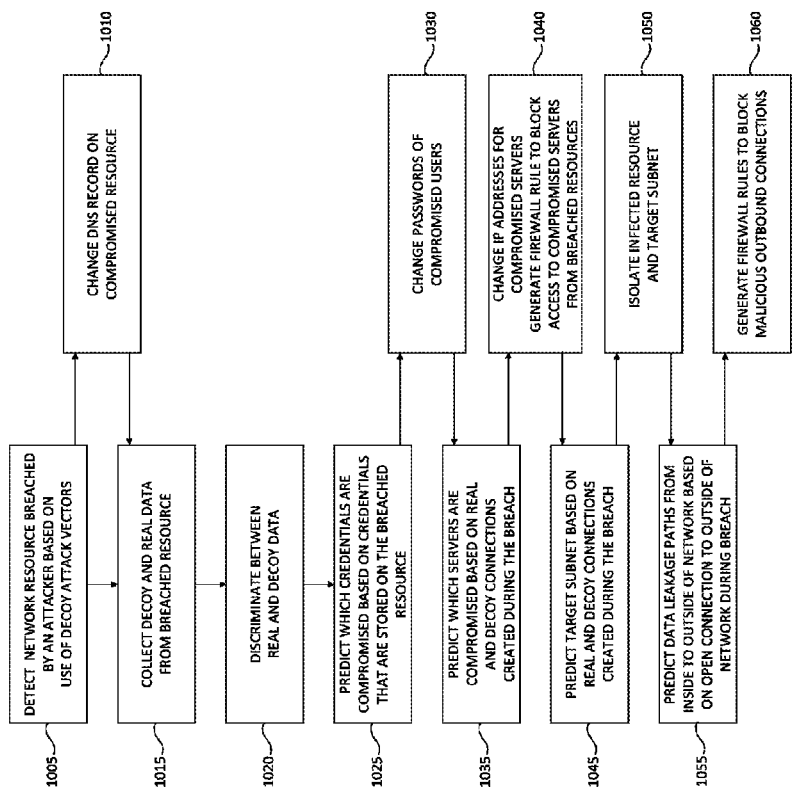
FIG. 3 is a simplified flowchart of a method for prediction and prevention of an attacker's next action in a compromised network, in accordance with an embodiment of the present invention.

Reference is made to FIG. 3, which is a simplified flowchart of a method for prediction and prevention of an attacker's next action in a compromised network, in accordance with an embodiment of the present invention. At operation 1005, decoy management server 210 detects breach of a resource of enterprise network 200, based on an attacker's use of one or more decoy attack vectors. At operation 1010, in response to detection of the breach at operation 1005, decoy management server 210 changes one or more DNS records for the breached resource on DNS server 170.

At operation 1015, decoy management server 210 collects data from the forensic report received by forensic application 213, the collected data including both decoy and real data for the breached resource. At operation 1020, decoy management server 210 discriminates between the real and the decoy data collected at operation 1015.

At operation 1025, decoy management server 210 predicts which credentials are compromised, based on credentials that are stored on the breached resource. At operation 1030, in response to the prediction at operation 1005, decoy management server 210 changes passwords of compromised users.

At operation 1035, decoy management server 210 predicts which servers in network 200 are compromised, based on real and decoy connections created during the breach. At operation 1040, in response to the prediction at operation 1035, decoy management server 210 changes IP addresses for compromised servers. Optionally, in addition, firewall rules may be generated to block the compromised servers from being accessed from the breached resources.

At operation 1045, decoy management server 210 predicts one or more target subnets, based on real and decoy connections created during the breach. At operation 1050, in response to the prediction at operation 1045, decoy management server 210 isolates the infected resource and the one or more target subnets.

At operation 1055, decoy management server 210 predicts data leakage paths from inside network 200 to outside network 200, based on an open connection to outside of the network during the breach. At operation 1060, in response to the prediction at operation 1055, decoy management server 210 generates firewall rules to block malicious outbound connections. In an alternative embodiment, decoy management server 210 may generate firewall rules to re-direct outbound connections to a designated resource within network 200.

Each of the individual response operations 1010, 1030, 1040, 1050 and 1060 is itself optional, and may not be performed in some embodiments of the present invention. Moreover, response operations 1010, 1030, 1040, 1050 and 1060 may be performed automatically by decoy management server 210, or semi-automatically in conjunction with confirmation by an administrator, or manually whereby the method recommends each response operation to an administrator, but the administrator must manually perform the operation.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A method for cyber security, comprising:
   detecting, by a decoy management server, a breach by an attacker of a specific resource within a network of resources in which users access the resources based on credentials, wherein access to the resources via network connections is governed by a firewall, wherein each resource has a domain name server (DNS) record stored on a DNS server, and wherein some of the resources are servers that are accessed via IP addresses;
   changing, by the decoy management server, the DNS record for the breached resource on the DNS server, in response to said detecting;
   predicting, by the decoy management server, which credentials are compromised, based on credentials stored on the breached resource;
   changing, by the decoy management server, those credentials that were predicted to be compromised, in response to said predicting which credentials;
   predicting, by the decoy management server, which servers in the network are compromised, based on connections created during the breach;
   changing, by the decoy management server, IP addresses of the predicted compromised servers in response to said predicting which servers;
   generating firewall rules to block access to the predicted compromised servers from the breached resource, in response to said predicting which servers;
   predicting, by the decoy management server, a target subnet, based on real and decoy connections created during the breach; and
   isolating, by the decoy management server, the target subnet in response to said predicting a target subnet.

2. The method of claim 1 wherein said changing the DNS record and said changing the predicted compromised credentials are performed automatically.

3. The method of claim 1 wherein said changing the DNS record and said changing the predicted compromised credentials are performed semi-automatically whereby the decoy management server requests confirmation by an administrator of the network prior to changing the DNS record and the predicted compromised credentials.

4. The method of claim 1 wherein said changing the DNS record and said changing the predicted compromised credentials are performed manually whereby the decoy management server recommends these changes to an administrator of the network, who then performs the changes manually.

5. The method of claim 1 comprising:
   predicting, by the decoy management server, data leakage paths from inside the network to outside the network, based on an open outbound connection during the breach; and
   creating, by the decoy management server, firewall rules to block that outbound connection in response to said predicting data leakage paths.

6. The method of claim 1 comprising:
   predicting, by the decoy management server, data leakage paths from inside the network to outside the network, based on an open outbound connection during the breach; and
   creating, by the decoy management server, firewall rules to re-direct that outbound connection to a resource within the network, in response to said predicting data leakage paths.

7. A method for cyber security, comprising:
   detecting, by a decoy management server, a breach by an attacker of a specific resource within a network of resources, wherein access to the resources via network connections is governed by a firewall, wherein each resource has a domain name server (DNS) record stored on a DNS server, and wherein some of the resources are servers that are accessed via IP addresses;
   predicting, by the decoy management server, which resources of the network were exposed to the attacker, based on address pointers stored on the breached resource;
   generating firewall rules to block access to the predicted exposed resources from the breached resource, in response to said predicting which resources;
   predicting, by the decoy management server, which servers in the network are compromised, based on connections created during the breach;
   changing, by the decoy management server, IP addresses of the predicted compromised servers in response to said predicting which servers;
   predicting, by the decoy management server, a target subnet, based on real and decoy connections created during the breach; and
   isolating, by the decoy management server, the target subnet in response to said predicting a target subnet.

8. The method of claim 7 comprising:
   predicting, by the decoy management server, data leakage paths from inside the network to outside the network, based on an open outbound connection during the breach; and
   creating, by the decoy management server, firewall rules to block that outbound connection in response to said predicting data leakage paths.

9. The method of claim 7 comprising:
predicting, by the decoy management server, data leakage paths from inside the network to outside the network, based on an open outbound connection during the breach; and
creating, by the decoy management server, firewall rules to re-direct that outbound connection to a resource within the network, in response to said predicting data leakage paths.

* * * * *